US011014498B2

(12) United States Patent
Kim

(10) Patent No.: US 11,014,498 B2
(45) Date of Patent: May 25, 2021

(54) VEHICLE AND CONTROL METHOD FOR CONTROLLING IMAGE ON IN-VEHICLE CLUSTER

(71) Applicants: HYUNDAI MOTOR COMPANY, Seoul (KR); KIA MOTORS CORPORATION, Seoul (KR)

(72) Inventor: Seong Un Kim, Anyang-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 331 days.

(21) Appl. No.: 16/189,198

(22) Filed: Nov. 13, 2018

(65) Prior Publication Data
US 2020/0062179 A1 Feb. 27, 2020

(30) Foreign Application Priority Data
Aug. 24, 2018 (KR) .................. 10-2018-0099309

(51) Int. Cl.
*B60R 1/00* (2006.01)
*B60K 35/00* (2006.01)
*G01C 21/36* (2006.01)
*G06K 9/00* (2006.01)
*G06T 17/05* (2011.01)

(52) U.S. Cl.
CPC .............. *B60R 1/00* (2013.01); *B60K 35/00* (2013.01); *G01C 21/3647* (2013.01); *G01C 21/3673* (2013.01); *G06K 9/00671* (2013.01); *G06K 9/00791* (2013.01); *G06T 17/05* (2013.01); *B60K 2370/152* (2019.05); *B60R 2300/205* (2013.01); *B60R 2300/304* (2013.01); *B60R 2300/307* (2013.01)

(58) Field of Classification Search
CPC ...... B60R 1/00; B60K 35/00; G01C 21/3673; G01C 21/3647; G06K 9/00671; G06K 9/00791; G06T 17/05
See application file for complete search history.

(56) References Cited

U.S. PATENT DOCUMENTS

| | | | |
|---|---|---|---|
| 9,349,350 B2 * | 5/2016 | Kim | G06F 3/147 |
| 9,598,013 B2 * | 3/2017 | Oh | G02B 27/01 |
| 10,386,199 B2 * | 8/2019 | Ko | G01C 21/3647 |
| 10,488,215 B1 * | 11/2019 | Yu | G01C 21/3632 |
| 10,495,476 B1 * | 12/2019 | Yu | G01C 21/3415 |
| 2012/0224060 A1 * | 9/2012 | Gurevich | B60R 1/00 348/148 |
| 2012/0226437 A1 * | 9/2012 | Li | G01C 21/3647 701/423 |

* cited by examiner

*Primary Examiner* — Ramsey Refai
(74) *Attorney, Agent, or Firm* — Morgan, Lewis & Bockius LLP

(57) ABSTRACT

A vehicle includes: an image sensor configured to acquire a front image; a navigation system configured to provide object information indicating information on one or more objects in front of the vehicle; a controller configured to generate a composite image of the acquired front image having the object information when the acquired front image includes at least object among the one or more objects; and a cluster configured to output the generated composite image.

21 Claims, 8 Drawing Sheets

VEHICLE AND CONTROL METHOD FOR CONTROLLING IMAGE ON IN-VEHICLE CLUSTER

CROSS-REFERENCE TO RELATED APPLICATION(S)

This application is based on and claims priority under 35 U.S.C. § 119 to Korean Patent Application No. 10-2018-0099309, filed on Aug. 24, 2018, in the Korean Intellectual Property Office, the disclosure of which is incorporated by reference herein in its entirety

TECHNICAL FIELD

The present disclosure relates to a vehicle controlling an image output from a cluster and a control method of the vehicle.

BACKGROUND

A cluster (instrumental panel) typically provides a driver with information about a vehicle condition through various display means.

Recently, as the vehicle having Advanced Driver Assistance Systems (ADAS) have been popular, the cluster provide a variety of information in an image manner by using data obtained via a radar or a camera mounted on the vehicle.

For the cluster, an electronic system implemented by a liquid crystal display (LCD) screen is widely used. For example, the LCD type cluster displays a warning light, a turn signal indicator, a speedometer, a tachometer, and a temperature indicator by using a variety of screen construction.

In addition to the above-described screen construction, a background image may be displayed on the cluster screen. Conventionally, since the background image is provided as a fixed image, it is not visible to the driver and there is a limit in effective transmission and transmission of a variety of information.

SUMMARY

An aspect of the present disclosure provides a cluster capable of outputting an image in which information on an object is displayed on an actual image acquired by recording a front of a vehicle.

Additional aspects of the present disclosure will be set forth in part in the description which follows, and in part, will be obvious from the description, or may be learned by practice of the present disclosure.

In accordance with an aspect of the disclosure, a vehicle includes: an image sensor configured to acquire a front image; a navigation system configured to provide object information indicating information on one or more objects in front of the vehicle; a controller configured to generate a composite image of the acquired front image having the object information when the acquired front image includes at least object among the one or more objects; and a cluster configured to output the generated composite image.

The object information may include at least one of a name of building, a building address, the use of building and information on a business name.

The controller may generate a mapping image in which at least one area of the acquired front image is displayed on an output area of the cluster.

The controller may convert the acquired front image from an actual image to a virtual image.

The cluster may output at least one of the actual image and the virtual image according to a driver's input.

The controller may generate a front image on which the object information is overlaid on the object.

The controller may generate a front image in which an indicator indicting the object information is tagged to an area adjacent to the object.

The image sensor may adjust an acquisition period of the front image according to the driver's input.

The controller may generate an image in which the object information is given to at least one object contained in a first front image and a second front image, wherein the second front image may be acquired after a point of time of acquiring the first image.

The vehicle may further include a storage configured to store the first front image and the second front image.

The cluster may adjust a speed, at which the first front image is changed to the second front image, to be proportional to a driving speed of the vehicle.

The controller may select the type of object on which the object information is displayed, according to the driver's input, and the cluster may output a front image on which the selected type of object is displayed.

In accordance with another aspect of the disclosure, a control method of a cluster of a vehicle includes: acquiring, by an image sensor, a front image of the vehicle; receiving, by a controller, object information indicating information on one or more objects which are located in front of the vehicle; generating, by the controller, a composite image of the acquired front image having the object information when at least object among the one or more objects is contained in the acquired front image; and outputting, by the controller, a front image on which the object information is displayed on a cluster. The acquisition of the front image of the vehicle may include generating a mapping image in which at least one area of the acquired front image is displayed on an output area of the cluster.

The acquisition of the front image of the vehicle may include converting the acquired front image from an actual image to a virtual image.

The output of the front image on which the object information is displayed may include outputting at least one of the actual image and the virtual image according to the driver's input.

The generation of the image in which the object information is given to the object may include generating a front image in which the object information is overlaid on the object.

The generation of the image in which the object information is given to the object may include generating a front image in which an indicator indicting the object information is tagged to an area adjacent to the object.

The acquisition of the front image of the vehicle may include adjusting an acquisition period of the front image according to the driver's input.

The adjustment of the acquisition period of the front image according to the driver's input may include generating an image in which the object information is given to at least one object contained in a first front image and a second front image that is acquired after a point of time of acquiring the first image, and storing the first front image and the second image.

The output of the front image on which the object information is displayed may include adjusting a speed, at which the first front image is changed to the second front image, to be proportional to a driving speed of the vehicle.

The output of the front image on which the object information is displayed may include selecting the type of object on which the object information is displayed, according to the driver input, and outputting a front image on which the selected type of object is displayed.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Figure 1:
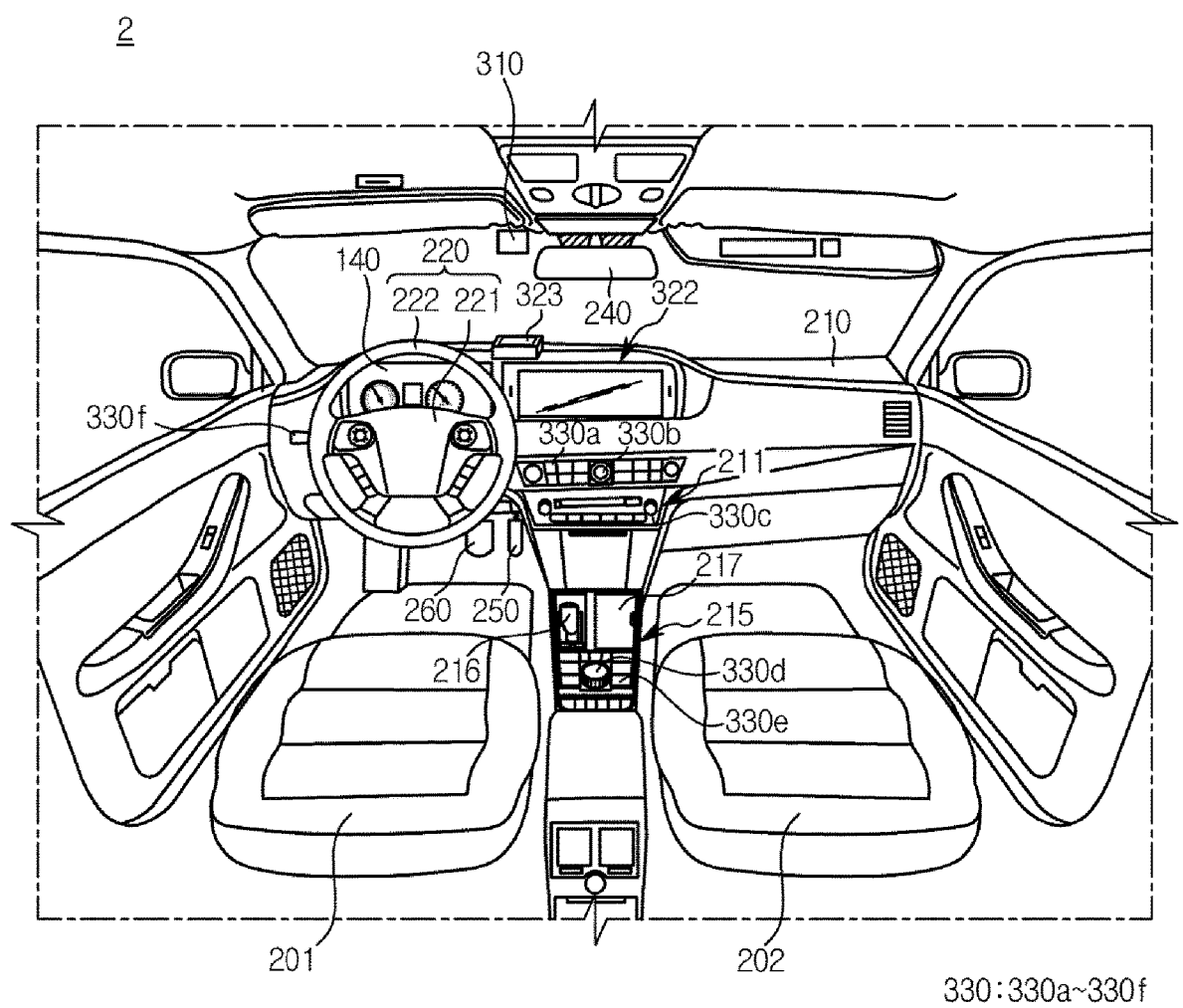
FIG. 1 is a view of an interior of a vehicle according to an exemplary embodiment of the present disclosure.

Embodiments described in the present disclosure and configurations shown in the drawings are merely examples of the embodiments of the present disclosure, and may be modified in various different ways at the time of filing of the present application to replace the embodiments and drawings of the present disclosure.

In addition, the same reference numerals or signs shown in the drawings of the present disclosure indicate elements or components performing substantially the same function.

The terms used herein are used to describe the embodiments and are not intended to limit and/or restrict the present disclosure. The singular forms "a," "an" and "the" are intended to include the plural forms as well, unless the context clearly indicates otherwise. In this present disclosure, the terms "including", "having", and the like are used to specify features, numbers, steps, operations, elements, components, or combinations thereof, but do not preclude the presence or addition of one or more of the features, elements, steps, operations, elements, components, or combinations thereof.

It will be understood that, although the terms first, second, third, etc., may be used herein to describe various elements, but elements are not limited by these terms. These terms are only used to distinguish one element from another element. For example, without departing from the scope of the present disclosure, a first element may be termed as a second element, and a second element may be termed as a first element. The term of "and/or" includes a plurality of combinations of relevant items or any one item among a plurality of relevant items.

Reference will now be made in detail to embodiments of the present disclosure, examples of which are illustrated in the accompanying drawings.

FIG. 1 is a view of an interior of a vehicle according to an embodiment.

Referring to FIG. 1, a driver seat 201, a passenger seat 202, a dashboard 210, a driving wheel 220, and a cluster 140 are provided in a vehicle interior 2.

In addition, the vehicle interior 2 may include an accelerator pedal 250 pressed by the driver according to the driver intention to accelerate, and a brake pedal 260 pressed by the driver depending on the driver intention to brake.

The dashboard 210 refers to a panel that divides the vehicle 1 into the interior of the vehicle 1 and the engine room and that provides a space in which various components needed for operation are installed. The dashboard 210 is provided in the front direction of the driver seat 201 and the passenger seat 202. The dashboard 210 may include an upper panel, a center fascia 211, and a gear box 215.

A display portion 322 may be installed on a central panel of the dashboard 210. The display portion 322 may provide a variety of information to the driver or passenger of the vehicle 1 as an image. For example, the display portion 322 visually provides a variety of information, such as a map, weather, news, various moving images or still images, and a variety of information related to a state or operation of the vehicle 1. Particularly, the display portion 322 may provide information related to an air conditioning device. In addition, the display portion 322 may be implemented using a navigation system (not shown) typically is used.

The display portion 322 may be provided inside a housing formed integrally with the dashboard 210 to allow only display panel to be exposed to the outside. In addition, the display portion 322 may be installed on a middle portion or a low end of the center fascia 211. Alternatively, the display portion 322 may be installed on an inner surface of a wind shield (not shown) or an upper surface of the dashboard 210 by using a separate support (not shown). In addition, the display portion 322 may be installed at various positions that the designer may consider.

At the inside of the dashboard 210, a variety of devices, such as a processor, a communication device, a global positioning system, and a storage may be installed. The processor installed in the vehicle may be configured to control various electronic devices installed in the vehicle 1 and configured to perform functions of the controller. The above-described device may be implemented using a variety of components such as a semiconductor chip, a switch, an integrated circuit, a resistor, a volatile or non-volatile memory (not shown) or a printed circuit board.

The center fascia 211 may be installed at the center of the dashboard 210 and may include inputters 330a to 330c receiving various commands related to the vehicle. The inputters 330a to 330c may be implemented using a physical button, a knob, a touch pad, a touch screen, a stick type operation device, or a trackball. The driver can control various operations of the vehicle 1 by operating the inputters 330a to 330c.

The gear box 215 is provided between the driver seat 201 and the passenger seat 202 at the low end of the center fascia 211. The gear box 215 may be provided with a gear 216, a housing box 217, and various inputters 330d to 330e. The inputters 330d to 330e may be implemented using a physical button, a knob, a touch pad, a touch screen, a stick type operation device, or a trackball.

When the driver selects a navigation function, the inputter 330: 330a to 330f may receive information on a destination and transmit the input destination information to a navigation system. In addition, the driver may input a position where the vehicle is currently located, as one of a first location and a second location through an additional input to the inputter 330. The first location and the second location input via the inputter 330 is a location in which an auto lock function or an auto unlock function is not performed, wherein the auto lock function or the auto unlock function is performed by a smart key system according to a conventional manner and the auto lock function is performed when a driver is away from the vehicle and the auto unlock function is performed when the driver approaches to the vehicle. Accordingly, the controller may be configured to allow a control process according to an embodiment to be operated by using geographical information on the current location of the vehicle without receiving additional position information from the navigation system.

The driving wheel 220 and the cluster 140 are provided in the direction of the driver seat in the dashboard 210.

The driving wheel 220 is configured to be rotatable in a predetermined direction in accordance with the operation of the driver. Since the front wheel or the rear wheel of the vehicle 1 is rotated in accordance with the rotational direction of the driving wheel 220, the vehicle 1 may be steered. In the driving wheel 220, a spoke 221 connected to a rotating shaft and a steering wheel 222 coupled to the spoke 221 are provided. In the spoke 221, an inputter configured to receive various commands may be provided, and the inputter may be implemented by a physical button, a knob, a touch pad, a touch screen, a stick type operation device, or a trackball. The steering wheel 222 may have a circular shape for the convenience of the driver, but the shape of the steering wheel 222 is not limited thereto. Further, an inputter of a direction indicator 330f may be installed behind of the driving wheel 220. The driver may input a driving direction or a signal for changing the direction via the direction indicator inputter 330f during the driver drives the vehicle 1.

The cluster 140 is configured to provide a variety of information related to the vehicle to the driver, wherein the variety of information related to the vehicle includes driving speed of the vehicle 1, revolutions per minute (RPM), fuel residual quantity, a temperature of engine oil, whether the direction indicator is turned on or off, or a driving distance. The cluster 140 may be implemented using a light or a scale plate, or a display panel according to an embodiment. When the cluster 140 is implemented using a display panel, the cluster 140 may provide the driver with more various information such as the fuel consumption and whether a variety of functions provided in the vehicle 1 is performed, as well as the above mentioned information.

A material of the display panel of the cluster 140 may be implemented by a liquid crystal display (LCD), a light emitting diode (LED), a plasma display panel (PDP), an organic light emitting diode (OLED), and a cathode ray tube. An output screen of the cluster 140 may be implemented in various shapes. The output screen of the cluster 140 may be provided such that information is displayed on a rectangular display panel. Alternatively, the output screen of the cluster 140 may have an arched shape to allow the driver to monitor the entire area though an empty space of the steering wheel.

The controller 130 may include at least one storage 150 storing a program for performing an operation to be described later, and at least one processor (not shown) for executing the stored program. When a plurality of storages 150 and processors is provided, they may be integrated on one chip, or they may be provided at physically separated positions. For example, the controller 130 may be implemented as an electronic control unit (ECU) and the storage 150 may be implemented as a memory, which is a storage device.

Figure 2:
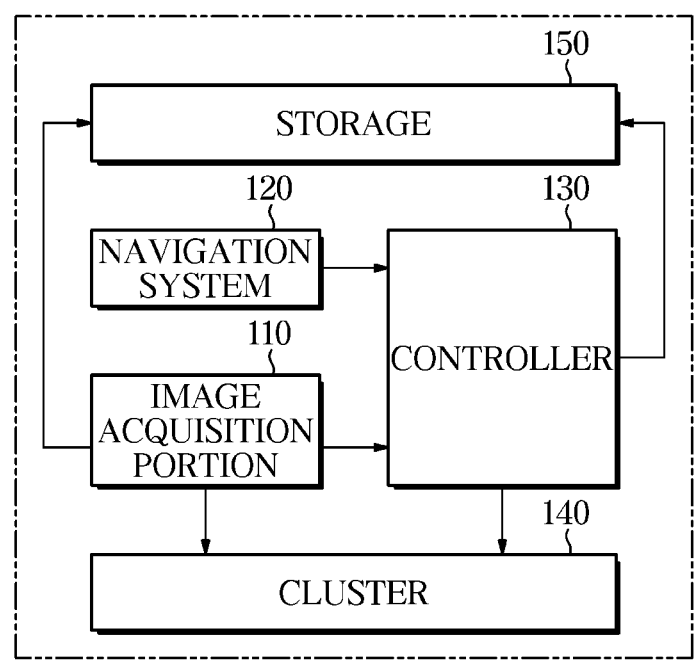
FIG. 2 is a control block diagram of the vehicle according to an exemplary embodiment of the present disclosure.

FIG. 2 is a control block diagram of the vehicle according to an embodiment. It is merely an example and thus it should be understood that a component is added or omitted. Hereinafter, a configuration and an operation of the control block diagram according to an embodiment will be described with reference to FIG. 2.

According to an embodiment, the vehicle includes an image sensor 110 acquiring a front image of the vehicle, a navigation system 120 providing information on an object placed around the front side of the vehicle, a controller 130 generating an image in which object information is given to an object, which is contained in the front image acquired by the image sensor 110, and a cluster 140 outputting a composite image on which the object information is indicated on the object. The front image represents the view of the front of the vehicle that is acquired in a driving direction of the vehicle, and the object represents an object indicated on the front image and has information such as a building and a facility. In addition, the composite image represents an image in which information on the building and facility is given to the acquired front image.

The image sensor 110 is provided in the vehicle and configured to record a front side with respect to the driving direction of the vehicle and configured to acquire the recorded image. For example, the image sensor 110 may include a camera and radar. In addition, the image sensor 110 may be a black box device. When the image sensor 110 is implemented by the black box device, it may be possible to output an image to which the object information is given, according to an embodiment, by using image data received from the black box device.

In addition, the image sensor 110 may regulate an acquisition period of the front image according to a driver's input. The image sensor 110 may continuously record the front of the vehicle so as to allow the cluster 140 to output a composite image in real time. However, when the image sensor 110 continuously records and then gives object information to an object contained in the continuous front image, an amount of calculate may be increased in an image procession and a data processing. Therefore, the image sensor 110 may discontinuously acquire a front image at a certain point of time according to a certain period, wherein the certain period varies according to the driver's input.

The navigation system 120 is provided in the vehicle and configured to provide information related to a certain position, to the driver in the form of a map, text, or various symbols. In addition, the navigation system 120 may provide information on an object contained in the image acquired by the image sensor 110, wherein the object may represent a building and a facility, which are acquired from the image.

It is understood that the navigation system 120 is not required to install on the vehicle 1. For example, the navigation system 120 may be a smart device to which a navigation application is installed or the navigation system 120 may be a variety of devices configured to provide position information and objection information via a communication module (not shown) connecting the vehicle to the external device.

The controller 130 receives the object information from the navigation system 120, and gives the object information to the front image provided from the image sensor 110. The controller 130 may transmit image data to which the object information is given, to the cluster 140. The image data may include data related to an actual image on which the object information is indicated on each object, and data related to a virtual image on which the object information is indicated on each object The actual image refers to an actual driving image acquired by recording a front view of the vehicle by the image sensor 110 without change. The virtual image refers to an image on which unnecessary image data element is removed from actual image data received from the image sensor 110. According to an embodiment, the controller 130 may convert the actual image acquired by the image sensor 110 to the virtual image. Particularly, when the cluster 140 does not implement a specific color due to the characteristics of the display panel of the cluster 140, the controller 130 may convert the specific color to another color that can be implemented. In addition, the controller 130 may generate a virtual image that is simplified to be output as at least two kinds of color, a gray tone, and a black and white mode so that the kinds of the color implemented on the cluster 140 is limited.

According to an embodiment, the controller 130 may generate a mapping image so that at least one part of the front image acquired by the image sensor 110 is displayed on an output area of a screen of the cluster 140. The output area of the cluster 140 may be selected by the shape of the display panel that is a component of the cluster 140. For example, the output area of the cluster 140 may be selected according to the shape of the conventional instrument panel and thus the output area of the cluster 140 may have an arched shape or an oval shape. It is not required that the cluster 140 outputs an image acquired by the image sensor 110 without change and it is needed to remove unnecessary area from the image. Therefore, the controller 130 may perform a process of correcting the area of the front image acquired by the controller 130. A detail process of correcting the area of the front image will be described with reference to FIGS. 4 and 5.

The cluster 140 may output an actual front image acquired by the image sensor 110 without change. Alternatively, the cluster 140 may output a composite image on which object information is displayed by receiving data, which is related to a composite image on which object information is displayed, from the controller 130. The cluster 140 may output a virtual image by receiving data, which is related to a virtual image on which object information is displayed.

According to an embodiment, the cluster 140 may output at least one of the actual image and the virtual image according to the driver's input. When the driver wants an image of the cluster 140 having a back ground image that is simpler than the actual image, the cluster 140 may output an image generated by displaying object information on the virtual image not the actual image.

The composite image output from the cluster 140 may depend on the acquisition period of the front image of the image sensor 110, wherein the acquisition period is adjusted in accordance with the driver's input. Front images acquired at a single period in order of time may include the first front image and the second front image. For example, during driving of the vehicle, the front image of the vehicle may be changed from the first front image to the second front image. The cluster 140 may output the front images by regulating a speed, in which the first front image is changed to the second front image, to be proportional to the driving speed of the vehicle. In addition, the cluster 140 may regulate the speed, in which the first front image is changed to the second front image, according to setting that is input from the driver.

The storage 150 may store a plurality of the front image acquired by the image sensor 110. Therefore, when the plurality of the front image stored in the storage 150 indicates that the vehicle passes through a route on which the vehicle previously drove, the storage 150 may provide the stored front image to the cluster 140 with reference to the position information provided from the navigation system 120 so that the cluster 140 outputs a composite image. The composite image may be one of the actual image and the virtual image to which the object information is given.

Figure 3:
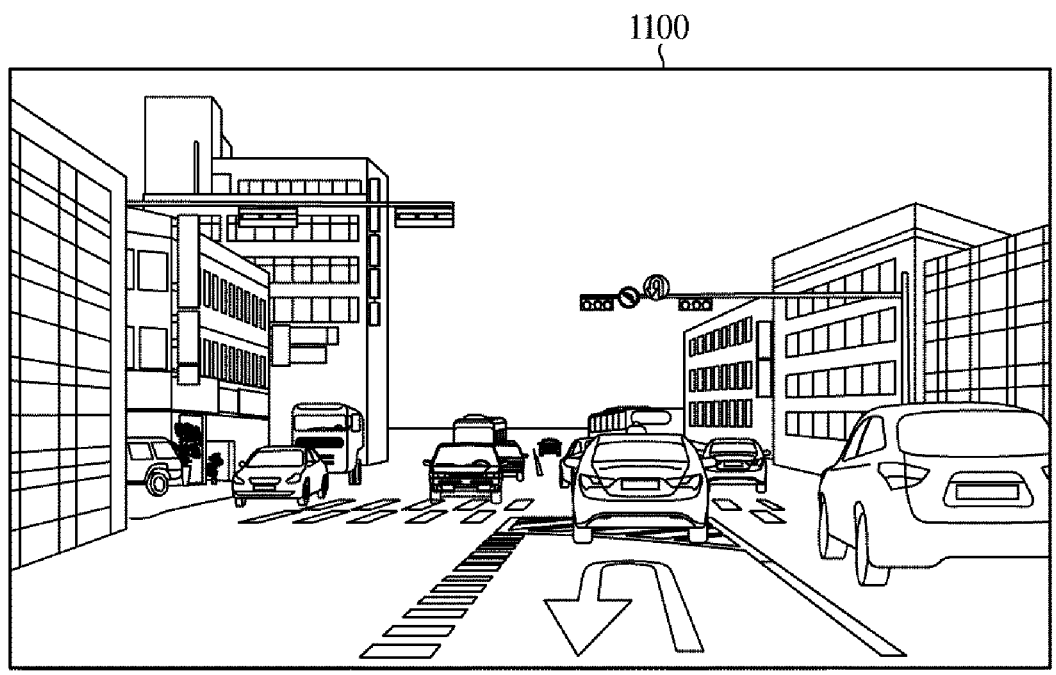
FIG. 3 is a view of an output screen of a cluster according to an exemplary embodiment of the present disclosure.
Figure 3:
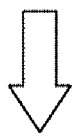
Figure 3:
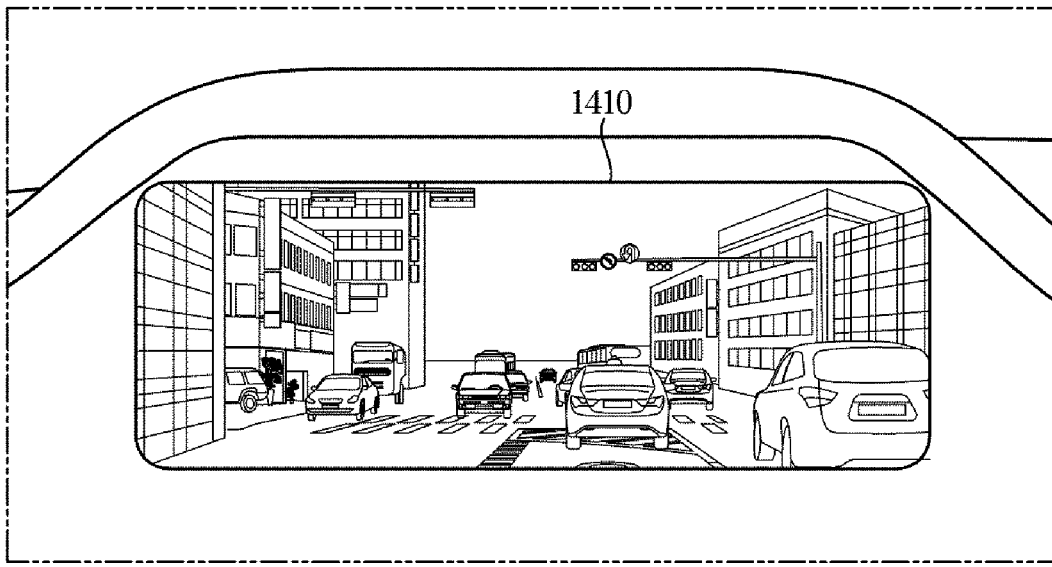

FIG. 3 is a view of an output screen of the cluster 140 according to an embodiment.

When the image sensor 110 acquires the front image (1100), the controller 130 may modify the front image to correspond to the output area so that the front image is displayed on the output area of the cluster 140. Particularly, the controller 130 may align the front image with the edge of the output area 1410 of the cluster 140 or remove unnecessary area from the front image.

As illustrated in FIG. 3, it is identified that the modified front image is output on the output area 1410 of the cluster 140. The front image 1100 may be an actual image in which an image pre-processing is not performed, or a virtual image in which unnecessary image data is removed and then simplified.

Figure 4:
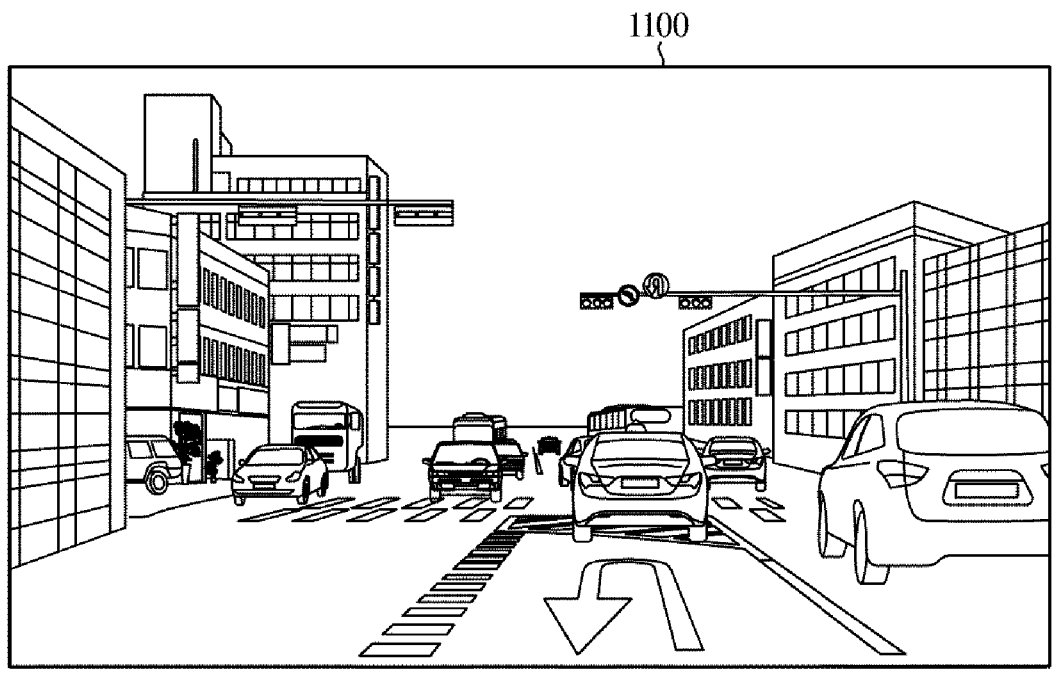
FIG. 4 is a view of an output screen of a cluster according to another exemplary embodiment of the present disclosure.
Figure 4:
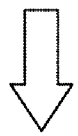
Figure 4:
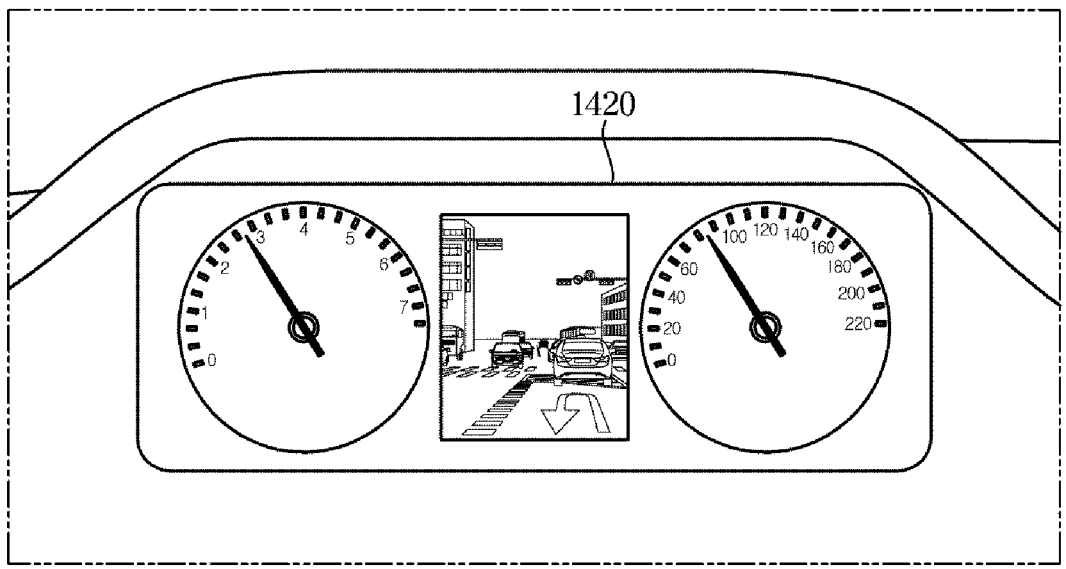

As illustrated in FIG. 4, on an output screen 1420 of the cluster 140, a tachometer screen, a speed gauge screen, and the front image may be simultaneously output. The arrangement of the tachometer screen, the speed gauge screen and the front image may vary according to setting that is input from the driver.

Figure 5:
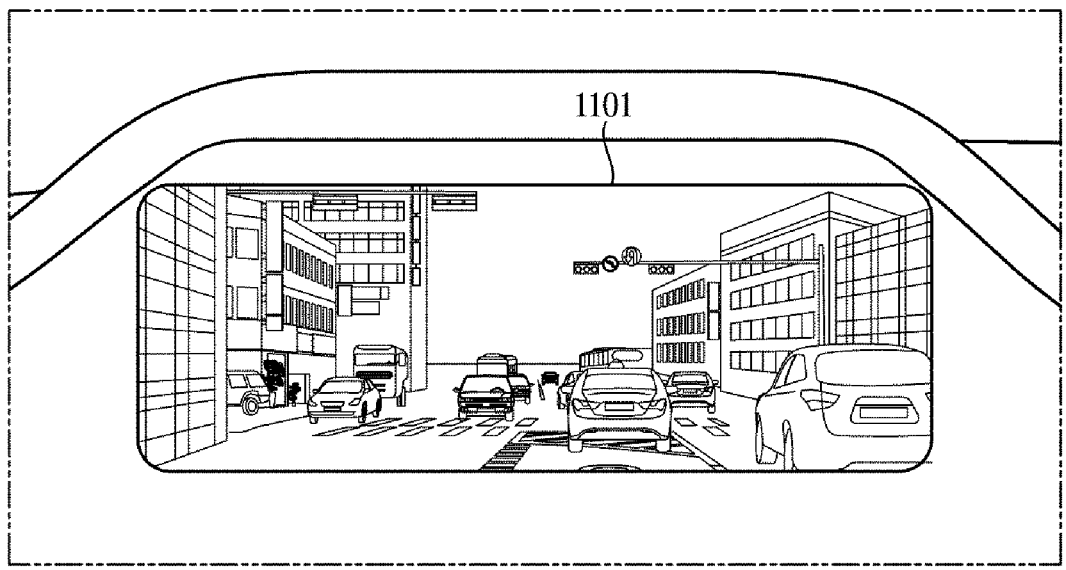
FIG. 5 is a view illustrating generating a virtual image according to an exemplary embodiment of the present disclosure.
Figure 5:
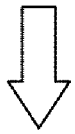
Figure 5:
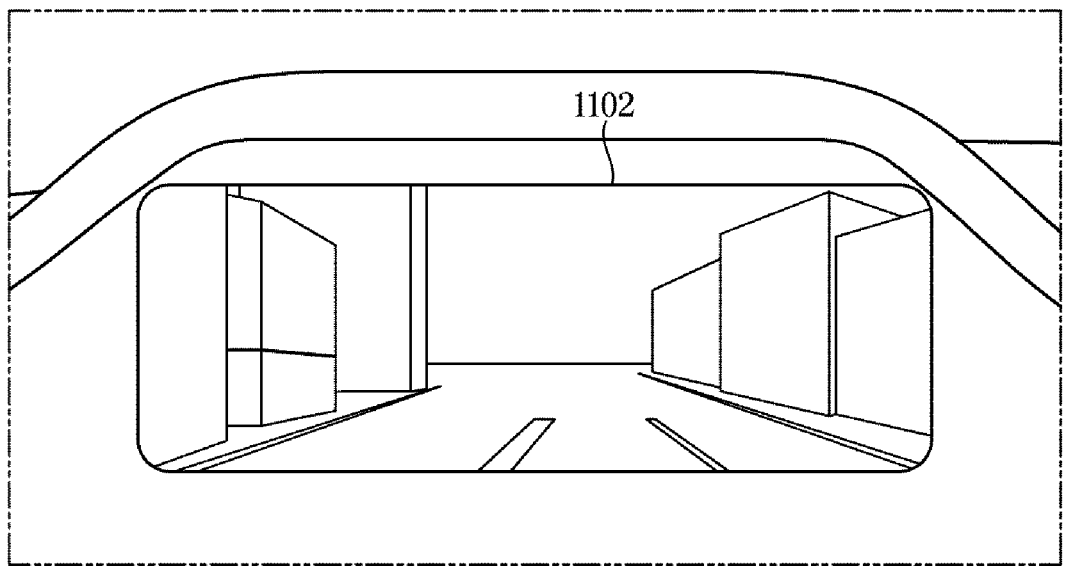

FIG. 5 is a view illustrating generating a virtual image according to an embodiment.

The virtual image 1102 represents an image in which unnecessary elements are removed from the actual image 1101 received from the image sensor 110. Particularly, when the cluster 140 does not implement a specific color, the cluster 140 may convert the color into a color that is replaceable. The virtual image 1102 may be generated to be output as at least two kinds of color, a gray tone, and a black and white mode so that the kinds of the color implemented on the cluster 140 is limited.

According to an embodiment, the controller 130 may convert the front image acquired by the image sensor 110 into the virtual image 1102, and transmit the virtual image 1102 to the cluster 140. Accordingly, the cluster 140 may output a front image through the virtual image 1102 other than the actual image 1101, as an image for outputting a composite image. The controller 130 may control the cluster 140 so that the cluster 140 outputs at least one of the actual image 1101 and the virtual image 1102 according to the driver input.

According to an embodiment, it may be possible to provide visual elements having improved information perception to the driver, by displaying object information about objects such as buildings and facilities contained in the composite image output on the cluster 140.

Hereinafter a method of displaying object information on the output composite image will be described in detail.

Figure 6:
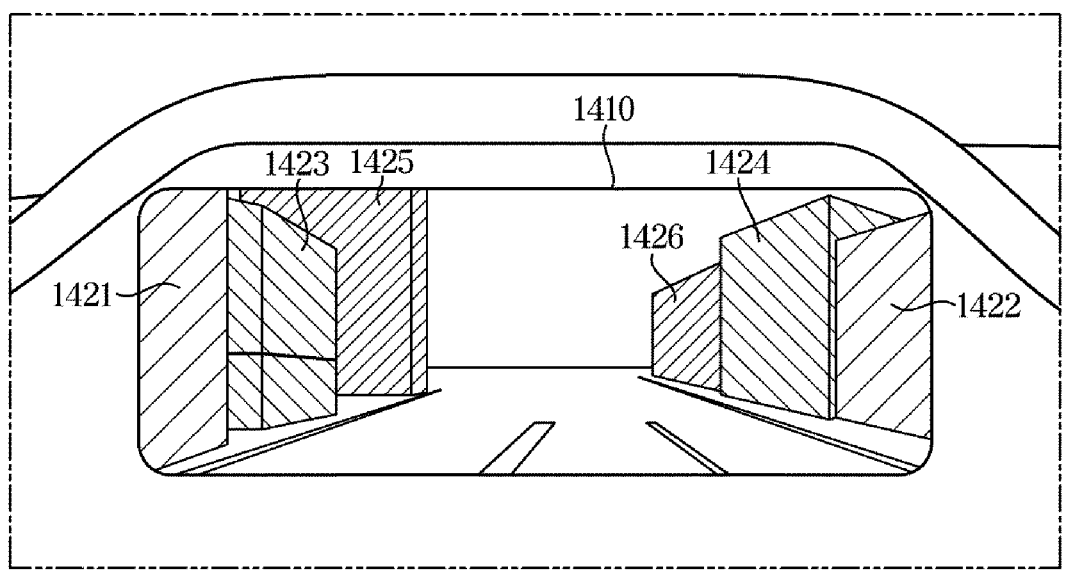
FIG. 6 is a view illustrating an overlaid object according to an exemplary embodiment of the present disclosure.

FIG. 6 is a view illustrating an overlaid object according to an embodiment.

As illustrated in FIG. 6, an image output on the output area 1410 of the cluster 140 includes a first object 1421, a second object 1422, a third object 1423, a fourth object 1424, a fifth object 1425, and a sixth object 1426. Various types of buildings or facilities may be captured within the composite image acquired when the vehicle drives on the road. It is identified that the plurality of objects is displayed such that a variety kinds of building is classified and then contained in the composite image.

The plurality of objects may be displayed such that object information is overlaid so that the plurality of objects is distinguished from other objects. The object information represents a tool configured to distinguish terrain such as buildings and facilities contained in the front image. For example, the object information may be related to a name, an address and a business name of building.

The object information may be displayed by being divided for each object, by using a variety of visual elements. For example, when an object is the hospital, the object may be displayed in green color, and when an object is the gasoline station, the object may be displayed in red color. Accordingly, the color may be one of the object information. As another example, different transparency may be applied to distinguish different objects. In this case, the transparency may be one of the object information. For the convenience of description, color and transparency are described as an example, but is not limited thereto. Therefore, various image composition methods may be uses if it does not impair the visual quality of the composite image.

According to an embodiment, the controller 130 may generate a composite image in which object information is overlaid on each object. The composite image may be one of an actual image acquired by the image sensor 110 or a virtual image that is converted from the actual image. According to an embodiment, by emphasizing a main building image displayed on the composite image by using the overlay method, it may be possible to allow the driver to acquire information, which is not easily identified with naked eyes during driving, through an output image of the cluster 140.

According to an embodiment, the controller 130 may control the object information so that the object information is selectively displayed according to the position of the object. For example, when with respect to the current position of the vehicle, the first object 1421 and the second object 1422 are placed at the same distance and the third object 1423 and the fourth object 1424 are placed at a greater distance, the controller 130 may generate an image in which object information is overlaid on the first object 1421 and the second object 1422 and object information is not overlaid on the third object 1423 and the fourth object 1424.

Figure 7:
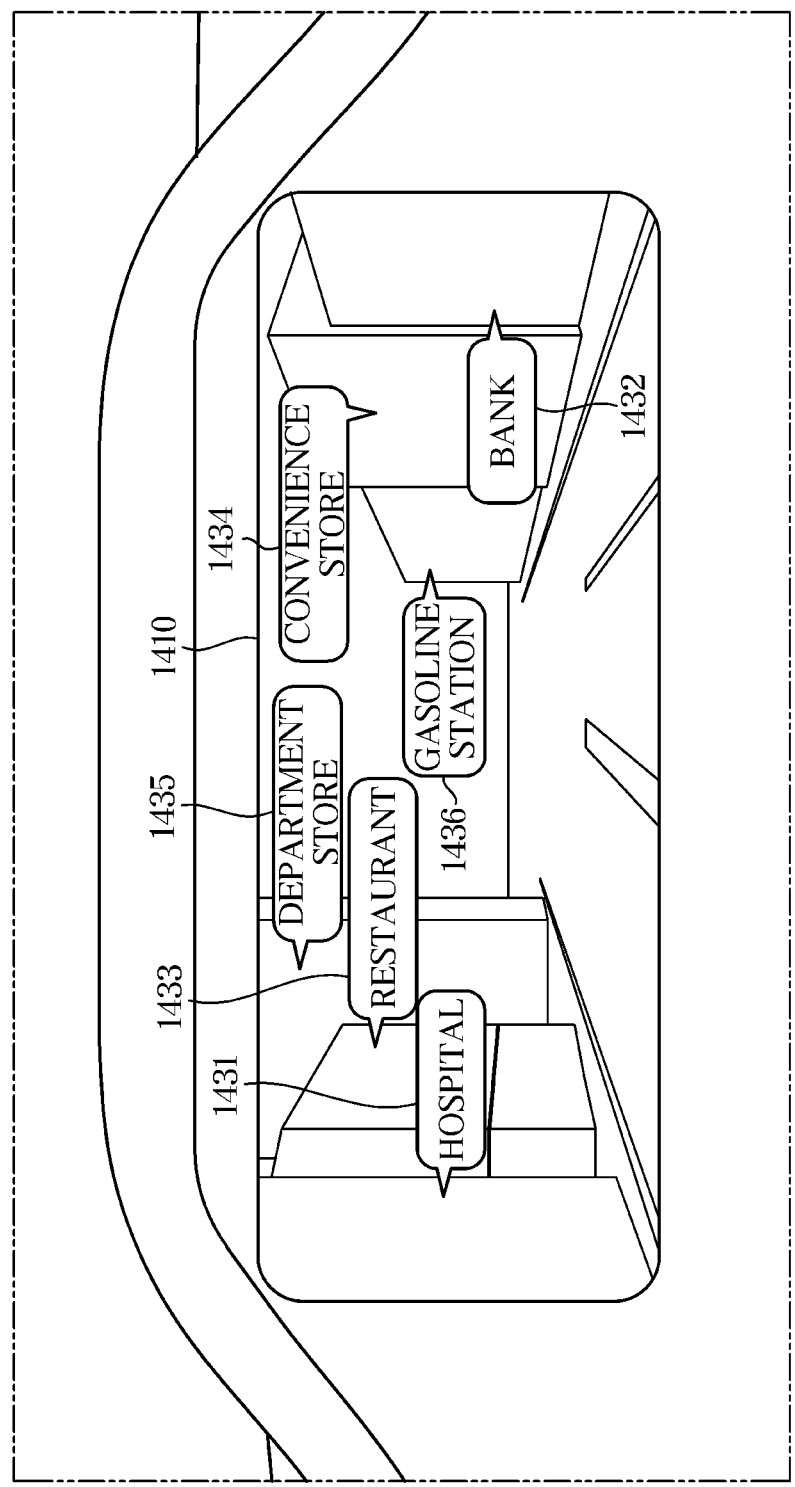
FIG. 7 is a view illustrating an object to which an indicator is tagged according to another exemplary embodiment of the present disclosure.

FIG. 7 is a view illustrating an object to which an indicator is tagged according to another embodiment.

According to another embodiment, an indicator represents a display means displaying information on an object with texts, symbols, marks. According to another embodiment, a method of displaying object information may employ a method of tagging an indicator to an area adjacent to the object.

As illustrated in FIG. 7, the image output from the output area 1410 of the cluster includes a first object 1431, a second object 1432, a third object 1433, a fourth object 1434, a fifth object 1435, and a sixth object 1436. An indicator on which text is displayed is tagged to each object, wherein the text indicates information of building.

According to another embodiment, the controller 130 may generate a composite image in which the indicator indicating the object information is tagged to the area adjacent to the object. According to another embodiment, since a main building image is used in the composite image without change and an indicator is displayed on an area adjacent to the main building image, the driver may acquire information on each building through the output image.

According to an embodiment, the controller 130 may select the type of object on which the object information is displayed, according to the driver's input. For example, when the driver wants to acquire information about the gasoline station during driving, the controller 130 may allow object information to be displayed on an object corresponding to the gasoline station according to setting that is input by the driver. The cluster 140 may output a composite image on which the selected type of object is displayed according to the input from the driver who selects the type of the object.

Hereinafter a method of controlling the cluster of the vehicle according to an embodiment will be described.

Figure 8:
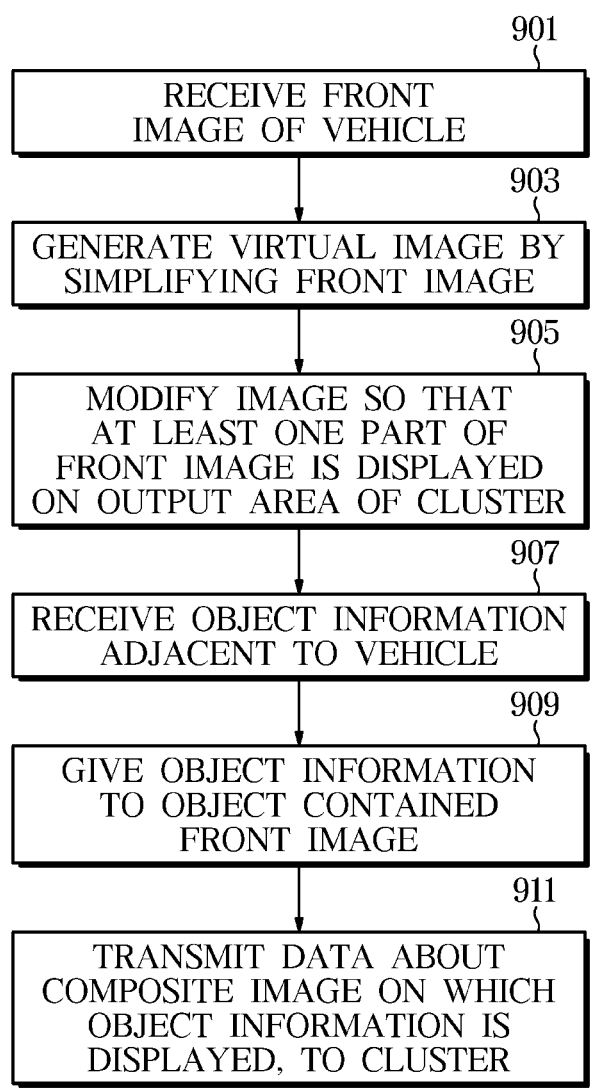
FIG. 8 is a flowchart of a control method of the vehicle according to an exemplary embodiment of the present disclosure.

FIG. 8 is a flowchart of a control method of the vehicle according to an embodiment. It is merely an example and thus it should be understood that a step is added or omitted. In addition, a subject of the respective operations will be not noted as needed.

The vehicle receives the front image of the vehicle (S901).

The vehicle generates a virtual image by simplifying the front image (S903). The virtual image refers to image data from which unnecessary image data elements is removed based on the received actual image data.

The vehicle modifies the image so that at least a part of the front image is displayed in the output screen of the cluster (S905). Particularly, the vehicle may perform a mapping on the front image by aligning the front image with an edge of the output screen of the cluster or by removing unnecessary area from the area of the front image.

The vehicle receives object information adjacent to the vehicle (S907). The object information refers to information on an object contained in the composite image. The object information may be transmitted from the navigation system.

When receiving the information on the object from the navigation system, the vehicle gives the object information to the object contained in the front image (S909). When the vehicle gives the object information to the object, the vehicle indicates the information on the object on the output composite image by using the overlay method or indicator tag method, as illustrated in FIGS. 6 and 7.

When the object information is given to at least one object, the vehicle transmits data related to the composite image on which the object information is displayed to the cluster (S911). In this case, the cluster may output the composite image on which the object information is displayed. According to the driver's input, the front image may be output as at least one of the actual image and the virtual image, and a variety of method of displaying the object information may vary according to setting that is input from the driver.

As is apparent from the above description, the vehicle and the control method of the cluster of the vehicle improve the driver's concentration on the driving and improve the drivers' recognition of the additional information.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A vehicle comprising:
   an image sensor configured to acquire a front image;

a navigation system configured to provide object information indicating information on one or more objects in front of the vehicle;

a controller configured to generate a composite image of the acquired front image having the object information when the acquired front image includes at least one object among the one or more objects; and a cluster configured to store color information implemented in the cluster, and output the composite image, wherein the controller identifies color information of the generated composite image, wherein, when the identified color information and the color information implemented in the cluster are different, the controller changes the identified color information based on the color information implemented in the cluster and controls the cluster so that the composite image is displayed in the cluster based on the changed color information, and wherein the front image includes a first front image and a second front image.

2. The vehicle of claim 1, wherein the object information comprises at least one of a name of a building, a building address, information on use of the building, or information on business in the building.

3. The vehicle of claim 1, wherein the controller modifies at least one part of the acquired front image to correspond to a shape of the cluster.

4. The vehicle of claim 1, wherein the controller converts the acquired front image from an actual image to a virtual image.

5. The vehicle of claim 3, wherein the cluster outputs at least one of the actual image or the virtual image according to a driver's input.

6. The vehicle of claim 1, wherein the controller generates the composite image by overlaying the object information on the one or more objects in the front image.

7. The vehicle of claim 1, wherein the controller generates the composite image having an indicator indicting the object information in areas adjacent to the one or more objects, respectively, on the cluster.

8. The vehicle of claim 1, wherein the image sensor adjusts an acquisition period of the front image according to a driver's input.

9. The vehicle of claim 7, wherein the controller generates an image in which the object information is given to the at least one object contained in the first front image and the second front image, wherein the second front image is acquired after the first image is acquired, and wherein the vehicle further comprises a storage configured to store the first front image and the second front image.

10. The vehicle of claim 8, wherein the cluster adjusts a speed, at which the first front image is changed to the second front image, to be proportional to a driving speed of the vehicle.

11. The vehicle of claim 1, wherein the controller selects types of the one or more objects displayed with the object information, according to a driver's input, and wherein the cluster outputs the composite image on which the selected types of the one or more object are displayed.

12. A control method of a cluster of a vehicle comprising steps of:

acquiring, by an image sensor, a front image of the vehicle;

receiving, by a controller, object information indicating information on one or more objects which are located in front of the vehicle;

generating, by the controller, a composite image of the acquired front image having the object information when at least object among the one or more objects is contained in the acquired front image;

identifying, by the controller, color information of the generated composite image;

when the identified color information and color information implemented in the cluster are different, changing, by the controller, the identified color information based on the color information implemented in the cluster; and outputting, by the controller, the generated composite image on the cluster based on the changed color information, wherein the front image includes a first front image and a second front image.

13. The control method of claim 12, wherein the step of acquiring comprises a step of modifying at least one part of the acquired front image to correspond to a shape of a cluster.

14. The control method of claim 12, wherein the step of acquiring comprises a step of converting the acquired front image from an actual image to a virtual image.

15. The control method of claim 14, wherein the step of outputting comprises a step of outputting at least one of the actual image and the virtual image according to a driver's input.

16. The control method of claim 12, wherein the step of generating comprises a step of generating the composite image in which the object information is overlaid on the one or more objects.

17. The control method of claim 12, wherein the step of generating comprises a step of generating the composite image having an indicator indicting the object information in areas adjacent to the one or more objects, respectively on the cluster.

18. The control method of claim 12, wherein the step of acquiring comprises a step of adjusting an acquisition period of the front image according to a driver's input.

19. The control method of claim 18, wherein the step of adjusting comprises steps of:

generating an image in which the object information is given to the at least one object contained in the first front image and the second front image that is acquired after the first image is acquired; and storing the first front image and the second image.

20. The control method of claim 19, wherein the step of outputting comprises a step of adjusting a speed, at which the first front image is changed to the second front image, to be proportional to a driving speed of the vehicle.

21. The control method of claim 12, wherein the step of outputting comprises steps of:

selecting types of the one or more objects displayed with the object information, according to a driver's input; and outputting the composite image on which the selected types are displayed.

* * * * *